(12) United States Patent
Kikuchi et al.

(10) Patent No.: US 8,759,472 B2
(45) Date of Patent: Jun. 24, 2014

(54) POLYAMIDE-IMIDE RESIN INSULATING PAINT AND INSULATION WIRE USING THE SAME

(71) Applicant: Hitachi Magnet Wire Corp., Ibaraki (JP)

(72) Inventors: Hideyuki Kikuchi, Hitachi (JP); Yuzo Yukimori, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/870,269

(22) Filed: Apr. 25, 2013

(65) Prior Publication Data

US 2013/0228359 A1    Sep. 5, 2013

Related U.S. Application Data

(62) Division of application No. 12/213,267, filed on Jun. 17, 2008, now Pat. No. 8,466,251.

(30) Foreign Application Priority Data

Jan. 9, 2008    (JP) .................................. 2008-002055

(51) Int. Cl.
*C08G 73/00* (2006.01)
*B32B 27/34* (2006.01)

(52) U.S. Cl.
USPC ................. 528/170; 528/44; 528/60; 528/67; 528/73; 528/84; 428/372; 428/378; 428/379; 428/375; 428/383; 428/395

(58) Field of Classification Search
USPC ................. 428/372, 375, 378, 379, 383, 395; 528/44, 60, 67, 59, 73, 84, 170
See application file for complete search history.

(56) References Cited

U.S. PATENT DOCUMENTS

| 4,505,980 A | * | 3/1985 | Nishizawa et al. ........... 428/383 |
| 4,861,855 A | * | 8/1989 | Bockrath et al. .............. 528/125 |
| 5,393,612 A | | 2/1995 | Matsuura et al. |
| 6,288,342 B1 | * | 9/2001 | Ueoka et al. .............. 174/137 B |
| 6,811,875 B2 | | 11/2004 | Kikuchi et al. |
| 2006/0240255 A1 | | 10/2006 | Kikuchi et al. |
| 2009/0227714 A1 | | 9/2009 | Kawakami et al. |

FOREIGN PATENT DOCUMENTS

| JP | 03-181511 | 8/1991 |
| JP | 5-174632 | 7/1993 |
| JP | 06-032864 | 2/1994 |
| JP | 2897186 | 3/1999 |

(Continued)

OTHER PUBLICATIONS

English Translation of JP-2897186 (cited on IDS Apr. 25, 2013).*

(Continued)

*Primary Examiner* — Michael L Leonard
(74) *Attorney, Agent, or Firm* — Antonelli, Terry, Stout & Kraus, LLP.

(57) ABSTRACT

A polyamide-imide resin insulating paint according to the present invention includes polyamide-imide resin containing no halogen element in its molecular chain which is dissolved in a polar solvent, in which the polyamide-imide resin contains an aromatic diisocyanate component (A) having three or more benzene rings or an aromatic diamine component (E) having three or more benzene rings in a monomer, and a ratio M/N between a molecular weight (M) of the polyamide-imide resin per repeat unit and an average number (N) of amide groups and imide groups is equal to or more than 200.

12 Claims, 1 Drawing Sheet

(56) References Cited

FOREIGN PATENT DOCUMENTS

| | | |
|---|---|---|
| JP | 3496636 | 11/2003 |
| JP | 2004-137370 A1 | 5/2004 |
| JP | 2004-204187 | 7/2004 |
| WO | WO 2006/115124 | 11/2006 |

OTHER PUBLICATIONS

Japanese Office Action of Appln. No. 2008-002055 dated Dec. 8, 2009 with translation.

Japanese Search Report of Appln. No. 2010-024032 dated May 22, 2012 with partial English translation.

* cited by examiner

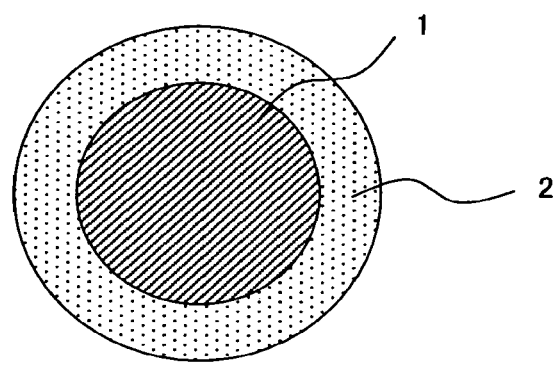

POLYAMIDE-IMIDE RESIN INSULATING PAINT AND INSULATION WIRE USING THE SAME

CROSS-REFERENCE TO RELATED APPLICATION

This application is a divisional application of U.S. application Ser. No. 12/213,267, filed Jun. 17, 2008, the contents of which are incorporated herein by reference.

CLAIM OF PRIORITY

The present application claims priority from Japanese patent application serial no. 2008-002055 filed on Jan. 9, 2008, the content of which is hereby incorporated by reference into this application.

BACKGROUND OF THE INVENTION

1. Field of the Invention

The present invention relates to a polyamide-imide resin insulating paint, and in particular, relates to a low-permittivity polyamide-imide resin insulating paint which can be obtained from a monomer having three or more benzene rings, and an insulation wire using the paint.

2. Description of Related Art

These days, hybrid cars are becoming popular as the result of the energy conservation policies. To improve fuel economy in hybrid cars and motor performance, drive motors are controlled by inverters and rapidly becoming smaller, lighter, highly heat-resistant and are driven under higher voltage. To meet a request for higher motor performance, such as small size, light weight, and high heat resistance, windings currently used for the motor coil require polyamide-imide enameled wires which have excellent heat resistance, mechanical characteristics that can withstand severe coil formation, and mission oil resistance. The mission-oil resistance greatly effects insulation-retaining capacity depending on types and quantities of oil additives. However, if influences of an oil additive are excluded, hydrolyzability due to moisture absorption is directly related to mission-oil resistance.

On the other hand, a polyamide-imide resin insulating paint is a heat-resistant polymeric resin having heat resistance properties, excellent mechanical characteristics, and hydrolyzability resistance properties in which amide groups and imide groups are compounded at a ratio of approximately fifty-fifty. Generally, the polyamide-imide resin insulating paint is created by a decarboxylation reaction of mainly two components, 4,4'-diphenylmethane diisocyanate (MDI) and trimellitic anhydride (TMA), in a polar solvent, such as N-methyl-2-pyrolidone (NMP), N,N-dimethylformamide (DMF), N,N-dimethylacetamide (DMAC), and dimethylimidazolidinone (DMI).

The isocyanate method and the acid chloride method are well-known examples of manufacturing methods for the polyamide-imide resin insulating paint. From the viewpoint of manufacturing productivity, the isocyanate method is usually utilized. An example of well-known polyamide-imide resin is one that is generated by a synthetic reaction of mainly two components which are 4,4'-diphenylmethane diisocyanate (MDI) and trimellitic anhydride (TMA) as an acid component. Furthermore, there is a method in which aromatic diamine and aromatic tricarboxylic anhydride react with each other under the acid excess condition at a compounding ratio from 50/100 to 80/100 in order to reform characteristics of polyamide-imide resin, and then polyamide-imide resin is synthesized by using a diisocyanate component (see JP-B-2897186). However, one of disadvantages of the film made of polyamide-imide resin insulating paint is its high permittivity. Due to the resin's structure, the existence of an amide group and an imide group significantly affects the increase in permittivity.

An insulation wire, specifically, an enameled wire used for a motor coil tends to be driven using an inverter to increase efficiency, and accordingly, excessive voltage (inverter surge) is generated causing partial discharge degradation to occur, resulting in insulation breakdown in many cases. Furthermore, motor drive by high-voltage coupled with the superposition of inverter surge increases the risk of the occurrence of partial discharge; therefore, it is becoming difficult to cope with insulation against inverter surge.

As a method of increasing voltage-applied service life by solving the problem of partial discharge, technology of a partial-discharge resistant enameled wire has been disclosed which is manufactured by applying on a conductor a partial-discharge resistant resin paint which is obtained by dispersing organo silica sol in a resin solution (e.g., see JP-B-3496636 and JP-A-2004-204187). There is another method in which an electric field between wires (electric field included in the layers of air present between wires) is eased to prevent partial discharge from occurring, thereby increasing a voltage-applied service life. The above method is classified into two methods: one method in which an electric field is eased by making wire surface conductive or semiconductive, and the other method in which an electric field is eased by decreasing permittivity of the insulation film.

However, the method in which the surface of an insulation wire is made conductive or semiconductive has many problems and is not practical because damage tends to occur during the coil winding process and insulation characteristics are degraded, and an insulation procedure must be conducted on the wire ends. On the other hand, with regard to the method in which permittivity of the insulation film is decreased, since decrease in permittivity depends on the resin structure, it was difficult to acquire both heat resistance and excellent mechanical characteristics simultaneously.

In a method described in JP-B-2897186, if 2,2-bis[4-(4-aminophenoxy)phenyl]propane (BAPP) and trimellitic anhydride (TMA) react with each other under the acid excess condition at a compounding ratio of 50/100 for the first stage synthetic reaction, due to the compounding ratio, acid anhydride preferentially reacts with an amino group than carboxylic acid; and furthermore, if a synthetic reaction proceeds, dehydration and imidization will occur, and bis trimellitic imide having carboxylic acid on both ends will be formed.

However, when a compounding ratio of BAPP is more than 50, a reaction between an amino group and TMA's carboxylic acid is hindered; therefore, even if a synthetic reaction is conducted at 200° C. which is the approximate boiling point of NMP, the amino group remains, and results in forming a urea linkage of an amino group and an isocyanate group during the second stage synthetic reaction; consequently, characteristics are aggravated. Furthermore, when a compounding ratio of BAPP is less than 50, acid anhydride remains during the first stage synthetic reaction, water associated with an imidization reaction remains within the system, and acid anhydride turns into carboxylic acid; consequently, reactivity significantly decreases.

The characteristics aggravation problems are derived from improper compounding balance of those functional groups. Accordingly, low-permittivity polyamide-imide which can cope with high-voltage drive is required to obtain excellent enameled wires.

SUMMARY OF THE INVENTION

Under these circumstances, it is an objective of the present invention to provide a polyamide-imide resin insulating paint which has low permittivity and high partial discharge inception voltage while maintaining excellent heat resistance, mechanical characteristics, and oil resistance. Furthermore, it is another objective of the present invention to provide insulation wires using the same paint.

According to one aspect of the present invention, a polyamide-imide resin insulating paint includes polyamide-imide resin containing no halogen element in its molecular chain which is dissolved in a polar solvent, in which the polyamide-imide resin contains an aromatic diisocyanate component (A) having three or more benzene rings or an aromatic diamine component (E) having three or more benzene rings in a monomer, and a ratio M/N between a molecular weight (M) of the polyamide-imide resin per repeat unit and an average number (N) of amide groups and imide groups is equal to or more than 200.

In the above aspect, the following modifications and changes can be made.

(i) The polyamide-imide resin contains the aromatic diisocyanate component (A), an aromatic diisocyanate component (B) having two or less benzene rings, and an acid component which comprises an aromatic tricarboxylic anhydride (C) alone or comprises both the aromatic tricarboxylic anhydride (C) and an aromatic tetracarboxylic dianhydride (D) simultaneously.

(ii) The polyamide-imide resin is made by mixing an aromatic imide prepolymer, which contains the aromatic diamine component (E) and an acid component comprising an aromatic tricarboxylic anhydride (C) and an aromatic tetracarboxylic dianhydride (D), with an aromatic diisocyanate component (B) having two or less benzene rings.

(iii) A compounding ratio between the aromatic diisocyanate component (A) and an acid component comprising the aromatic tricarboxylic anhydride (C) alone or comprising both the aromatic tricarboxylic anhydride (C) and the aromatic tetracarboxylic dianhydride (D) simultaneously is A/(C+D)=50/100 to 70/100.

(iv) A compounding ratio between the aromatic diamine component (E) and an acid component comprising the aromatic tricarboxylic anhydride (C) and the aromatic tetracarboxylic dianhydride (D) is E/(C+D)=51/100 to 70/100.

(v) A compounding ratio between the aromatic tricarboxylic anhydride (C) and the aromatic tetracarboxylic dianhydride (D) is C/D=100/0 to 60/40.

(vi) An insulation wire comprises a conductor and a film in which the above-mentioned polyamide-imide resin insulating paint is applied directly on the conductor or on another insulation film and is baked to form the film.

Thus, a polyamide-imide resin insulating paint according to the present invention is created such that the polyamide-imide resin monomer contains an aromatic diisocyanate component (A) having three or more benzene rings or an aromatic diamine component (E) having three or more benzene rings, and a ratio M/N between the molecular weight (M) of polyamide-imide resin per repeat unit and the average number (N) of amide groups and imide groups is equal to or more than 200; therefore, an abundance ratio between amide groups and imide groups contained in the polymer, which greatly affects the increase in permittivity, is reduced; consequently, it is possible to reduce permittivity of the film.

Furthermore, when an aromatic diamine (E) is included in a polyamide-imide resin, by simultaneously using an aromatic tricarboxylic anhydride (C) and an aromatic tetracarboxylic dianhydride (D) as acid components and synthesizing them, it is possible to suppress the formation of urea linkage caused by a reaction between residual amino groups and isocyanate groups described in JP-B-2897186.

ADVANTAGES OF THE INVENTION

By using a polyamide-imide resin insulating paint according to the present invention for a film of an insulation wire, it is possible to achieve low-permittivity and increase partial discharge inception voltage while maintaining general characteristics (heat resistance, mechanical characteristics, and oil resistance) equal to those of versatile polyamide-imide enameled wires made by synthesizing MDI and TMA.

BRIEF DESCRIPTION OF THE DRAWINGS

FIG. 1 is a schematic illustration showing a cross-sectional view of an insulation wire having a film to which a polyamide-imide resin insulating paint according to the present invention is applied.

DETAILED DESCRIPTION OF THE PREFERRED EMBODIMENTS

Hereafter, a preferred embodiment of polyamide-imide resin insulating paint according to the present invention will be described in detail. However, the present invention is not limited to the embodiments described herein.

The present invention is a polyamide-imide resin insulating paint including polyamide-imide resin containing no halogen element in its molecular chain which is dissolved in a polar solvent, wherein the polyamide-imide resin monomer contains an aromatic diisocyanate component (A) having three or more benzene rings or an aromatic diamine component (E) having three or more benzene rings, and a ratio M/N between a molecular weight (M) of the polyamide-imide resin per repeat unit and an average number (N) of amide groups and imide groups is equal to or more than 200. Furthermore, the polyamide-imide resin contains the aromatic diisocyanate component (A), an aromatic diisocyanate component (B) having two or less benzene rings, and an acid component which comprises an aromatic tricarboxylic anhydride (C) alone or comprises both the aromatic tricarboxylic anhydride (C) and an aromatic tetracarboxylic dianhydride (D) simultaneously; or the polyamide-imide resin is made by mixing aromatic imide prepolymer, which contains the aromatic diamine component (E) and an acid component comprising the aromatic tricarboxylic anhydride (C) and the aromatic tetracarboxylic dianhydride (D), with the aromatic diisocyanate component (B) having two or less benzene rings.

The polyamide-imide resin insulating paint according to the present invention is made by using a polar solvent, such as N-methyl-2-pyrolidone (NMP) or the like, as a main solvent and executing solution polymerization. Other than NMP which is a main solvent, γ-butyrolactone, N,N-dimethylacetamide (DMAC), N,N-dimethylformamide (DMF), dimethylimidazolidinone (DMI), cyclohexanone, and methylcyclohexanone, which do not inhibit synthetic reaction of polyamide-imide resin, can be used simultaneously as a solvent; and the NMP can be diluted using the solvent. Also, aromatic alkyl benzenes can be simultaneously used for a dilution purpose. However, it is necessary to carefully consider solvents which may decrease solubility of polyamide-imide.

From the viewpoints of characteristics and cost, polyamide-imide resin, which has been used most frequently for enameled wires, mainly includes two components: 4,4'-diphenylmethane diisocyanate (MDI) as an isocyanate component (B) and trimellitic anhydride (TMA) as an acid component (C). Generally, MDI and TMA are compounded at a fifty-fifty compounding ratio to synthesize a polyamide-imide resin, however, synthesis sometimes occurs with a slightly excess isocyanate component within a range between 1 and 1.05. This slightly excess isocyanate composition can also be applied to the reaction that uses isocyanate in the present invention.

As a diisocyanate component (B) having two or less benzene rings in the monomer, other than the above-exemplified 4,4'-diphenylmethane diisocyanate (MDI), for example, aromatic diisocyanate and its isomers and multimeric complexes, such as versatilely-used tolylene diisocyanate (TDI), naphthalene diisocyanate, xylylene diisocyanate, biphenyl diisocyanate, diphenyl sulfone diisocyanate, and diphenyl ether diisocyanate can be applied. Also, according to necessity, aliphatic diisocyanates, such as hexamethylene diisocyanate, isophorone diisocyanate, dicyclohexyl methane diisocyanate, and xylene diisocyanate can be applied, or alicyclic diisocyanates hydrogenerated with the aromatic diisocyanate, exemplified above, and its isomers can also be used alone or simultaneously.

Aromatic diisocyanate components (A) having three or more benzene rings in the monomer include 2,2-bis[4-(4-isocyanate phenoxy)phenyl]propane (BIPP), bis[4-(4-isocyanate phenoxy)phenyl]sulfone (BIPS), bis[4-(4-isocyanate phenoxy)phenyl]ether (BIPE), fluorene diisocyanate (FDI), 4,4'-bis(4-isocyanate phenoxy)biphenyl, and 1,4-bis(4-isocyanate phenoxy)benzene, and also include their isomers. By synthetically reacting those substances with aromatic diamine components having three or more benzene rings in the monomer, exemplified below, aromatic diisocyanate is manufactured. The manufacturing methods are not particularly limited; however, methods that use phosgene are the most desirable from an industrial aspect.

Aromatic diamine components (E) having three or more benzene rings in the monomer include 2,2-bis[4-(4-aminophenoxy)phenyl]propane (BAPP), bis[4-(4-aminophenoxy)phenyl]sulfone (BAPS), bis[4-(4-aminophenoxy)phenyl]ether (BAPE), fluorene diamine (FDA), 4,4'-bis(4-aminophenoxy)biphenyl, and 1,4-bis(4-aminophenoxy) benzene, and also include their isomers.

Trimellitic anhydride (TMA) can be used as aromatic tricarboxylic anhydride (C) which is an acid component. Although other aromatic tricarboxylic anhydrides, such as benzophenone tricarboxylic anhydride, can be used, TMA is most suitable. When synthesis is conducted by using aromatic diamine (E) having three or more benzene rings in the monomer, it is desirable that aromatic tricarboxylic anhydride (C) and tetracarboxylic dianhydride (D) be simultaneously used.

As tetracarboxylic dianhydride (D), pyromellitic dianhydride (PMDA), 3,3'4,4'-benzophenone tetracarboxylic dianhydride (BTDA), 3,3'4,4'-diphenyl sulfone tetracarboxylic dianhydride (DSDA), 4,4'-oxydiphthalic dianhydride (ODPA), and 3,3'4,4'-biphenyl tetracarboxylic dianhydride can be exemplified. Also according to necessity, butanetetracarboxylic dianhydride, 5-(2,5-dioxotetrahydro-3-furanyl)-3-methyl-3-cyclohexene-1,2-dicarboxylic anhydride, or alicyclic tetracarboxylic dianhydrides hydrogenerated with aromatic tetracarboxylic dianhydride, exemplified above, can be used simultaneously. Since reduction of permittivity and improvement of transparency of resin composition can be expected by simultaneously using an alicyclic structure substance, it may be used if necessary. However, the compounding quantity and chemical structure must be carefully considered to prevent a decrease in heat resistance.

It is desirable that a compounding ratio among an aromatic diisocyanate component (A) having three or more benzene rings in the monomer, aromatic tricarboxylic anhydride (C), and aromatic tetracarboxylic dianhydride (D) be $A/(C+D)=$ 50/100 to 70/100 (molar ratio).

It is desirable that a compounding ratio among an aromatic diamine component (E) having three or more benzene rings in the monomer, aromatic tricarboxylic anhydride (C), and aromatic tetracarboxylic dianhydride (D) be $E/(C+D)=51/100$ to 70/100 (molar ratio). When an aromatic diisocyanate component (A) is less than 50 and an aromatic diamine component (E) is less than 51, during the first stage synthetic reaction, acid anhydride remains, water associated with an imidization reaction remains within the system, and acid anhydride turns into carboxylic acid, thereby significantly decreasing reactivity; therefore, that situation is undesirable. If an aromatic diamine component (E) is more than 70, the compounding ratio of aromatic tetracarboxylic dianhydride (D) inevitably increases, accordingly imide groups significantly increase; consequently, mechanical and other excellent characteristics of polyamide-imide resin originated from amide groups are adversely effected; therefore, that situation is undesirable. It is desirable that a compounding ratio between the aromatic tricarboxylic anhydride (C) and aromatic tetracarboxylic dianhydride (D) be $C/D=100/0$ to 60/40.

Furthermore, it is desirable that a ratio M/N between the molecular weight (M=weight-average molecular weight Mw) of synthesized polyamide-imide resin per repeat unit and the total number (N) of amide groups and imide groups be equal to or more than 200. The lower the specific permittivity becomes, the more desirable it is; and for the inverter surge insulation to become effective, it is desirable that the specific permittivity be equal to or less than 3.5.

When synthesizing a polyamide-imide resin insulating paint, reaction catalysts, such as amines, imidazoles, and imidazolines, can be used, and it is desirable that a reaction catalyst which does not disturb the stability of the paint be used. When a synthetic reaction is halted, a sealant such as alcohol can be used.

EXAMPLES

The present invention will be described in more detail with reference to, but is not limited to, the following examples and comparative examples.

Raw-material composition and features of the polyamide-imide resin insulating paint and characteristics of the obtained enameled wire described in examples of the present invention and comparative examples will be shown in Tables 1 to 3 which will appear later in this document.

Examples 1 to 7 and Comparative examples 1 to 3 and 7 are examples of the synthesis of polyamide-imide resin insulating paint in which a diisocyanate component (A) is used for a polyamide-imide resin monomer, and the synthetic reaction was executed in the same manner as the synthesis of ordinary polyamide-imide resin paint as shown below.

A flask equipped with a stirrer, reflux condenser tube, nitrogen inflow tube, and thermometer was prepared. Next, raw-materials and solvents, shown in Examples 1 to 7 and Comparative examples 1 to 3 and 7, were poured into the flask at one time. Then, the mixture in the flask was stirred in a nitrogen atmosphere, heated up to 140° C. for approximately one hour, and allowed to react at that temperature for two hours so that a polyamide-imide resin solution with a reduced viscosity of approximately 0.5 dl/g can be obtained (details will be described later in this document).

Examples 8 to 14 and Comparative examples 4 to 6 are examples of the synthesis of polyamide-imide resin insulating paint in which a diamine component (E) is used for a polyamide-imide resin monomer, and synthetic reactions were executed in two stages as shown below.

A flask equipped with a stirrer, reflux condenser tube, nitrogen inflow tube, and thermometer was prepared. For the first stage synthetic reaction, a diamine component (E), shown in Examples 8 to 14 and Comparative examples 4 to 6, acid components of aromatic tricarboxylic anhydride (C) and aromatic tetracarboxylic dianhydride (D), and approximately 50 to 80% of solvent were poured into the flask; and the mixture in the flask was heated up to 180° C. for approximately one hour while being stirred in a nitrogen atmosphere and was allowed to react at that temperature for four hours while water generated by a dehydration reaction was being discharged to the outside of the system. After the above mixture was cooled to 60° C. in the same nitrogen atmosphere, a diisocyanate component (B) and remaining solvent were added to it. For the second stage synthetic reaction, the mixture was heated up to 140° C. for approximately one hour while being stirred in the nitrogen atmosphere, and was allowed to react at that temperature for two hours so that a polyamide-imide resin solution with a reduced viscosity of approximately 0.5 dl/g can be obtained (details will be described later in this document).

The polyamide-imide resin insulating paint was applied to a 0.8-mm copper conductor and was baked. Then, an enameled wire with a 45-μm thick insulation film was obtained.

FIG. 1 is a schematic illustration showing a cross-sectional view of an insulation wire having a film to which a polyamide-imide resin insulating paint according to the present invention is applied. As shown in FIG. 1, by applying a polyamide-imide resin insulating paint to a conductor 1 and baking it, an insulator film 2 can be obtained around the surface of the conductor 1. Moreover, it is possible to form another insulation film directly on a conductor 1, and then form a film 2 made of polyamide-imide resin insulating paint according to the present invention. In this case, another insulation film is not particularly limited as long as it does not disturb partial-discharge resistance or general characteristics of the polyamide-imide resin insulating paint.

Characteristics (e.g., dimension, flexibility, abrasion resistance, heat resistance, and softening resistance) of the enameled wire were measured by a method in accordance with JIS C 3003.

With regard to hydrolyzability resistance, 0.4-mL water and a twisted pair of enameled wires were put into a heat-resistant glass tube with inner volume of 400 mL, heated and melted by a burner and sealed; then processed in a constant-temperature bath of 140° C. for 1,000 hours, and taken out. Subsequently, insulation breakdown voltage was measured, and a remaining ratio was calculated for the insulation breakdown voltage of another twisted pair of enameled wires unprocessed the above hydrolyzation treatment.

A metal electrode was deposited on the surface of an enameled wire, and capacitance between the conductor and the metal electrode was measured; and then, based on the relation between the length of electrode and the thickness of film, specific permittivity was calculated. Capacitance was measured at 1 kHz by using an impedance analyzer. With regard to dry-time permittivity, the above-mentioned enameled wire was left in a constant-temperature bath of 100° C. for 50 hours and capacitance was measured while in the same bath. With regard to wet-time permittivity, the above-mentioned enameled wire was left in a thermo-hygrostat bath of 25° C. and 50% RH (relative humidity) for 50 hours and capacitance was measured while in the same bath.

With regard to partial discharge inception voltage, the above-mentioned enameled wire was left in a thermo-hygrostat bath of 25° C. and 50% RH for 50 hours, and then discharge inception voltage was measured at 50 Hz with a detection sensitivity of 10 pC.

TABLE 1

| | | | Example 1 | Example 2 | Example 3 | Example 4 | Example 5 | Example 6 | Example 7 |
|---|---|---|---|---|---|---|---|---|---|
| Raw-material composition of polyamide-imide resin paint | Diisocyanate component (A) having three or more benzene rings | BIPP (Mw = 462) | 231.0 (50.0) | 242.6 (52.5) | | | 219.5 (47.5) | 138.6 (30.0) | |
| | | BIPS (Mw = 484) | | | 338.8 (70.0) | | | | |
| | | BIPE (Mw = 436) | | | | 239.8 (55.0) | | | 305.2 (70.0) |
| | | FDI (Mw = 400) | | | | | 40.0 (10.0) | | |
| | Diisocyanate component (B) having two or less benzene rings | 4,4'-MDI (Mw = 250) | 125.0 (50.0) | 118.8 (47.5) | 62.5 (25.0) | 112.5 (45.0) | 106.3 (42.5) | 175.0 (70.0) | 75.0 (30.0) |
| | | 2,4'-MDI (Mw = 250) | | | 12.5 (5.0) | | | | |
| | | 2,4'-TDI (Mw = 174) | | | | | | | |
| | Tricarboxylic anhydride component (C) | TMA (Mw = 192) | 192.0 (100.0) | 182.4 (95.0) | 115.2 (60.0) | 172.8 (90.0) | 163.2 (85.0) | 192.0 (100.0) | 192.0 (100.0) |
| | Tetracarboxylic dianhydride component (D) | PMDA (Mw = 218) | | 10.9 (5.0) | | | | | |
| | | BTDA (Mw = 322) | | | | | 32.2 (10.0) | | |
| | | ODPA (Mw = 310) | | | | | 46.5 (15.0) | | |
| | | DSDA (Mw = 358) | | | | 143.2 (40.0) | | | |
| | Solvent | NMP | 1600 | 1600 | 2000 | 1600 | 1700 | 1200 | 1350 |
| | | γ-butyrolactone | | | | | | | |
| | | DMF | | | | | | 300 | 350 |
| Features of polyamide- | Appearance | | Brown | Brown | Brown | Brown | Light brown | Brown | Brown |

TABLE 1-continued

|  |  |  | Example 1 | Example 2 | Example 3 | Example 4 | Example 5 | Example 6 | Example 7 |
|---|---|---|---|---|---|---|---|---|---|
| imide resin paint | Reduced viscosity (dl/g) |  | 0.51 | 0.49 | 0.52 | 0.50 | 0.51 | 0.50 | 0.52 |
|  | Nonvolatile content (wt %) |  | 25.3 | 25.5 | 24.9 | 25.6 | 25.0 | 25.0 | 24.9 |
|  | Molecular weight per repeat unit (M) |  | 920.0 | 982.8 | 1947.8 | 1042.7 | 1146.2 | 835.2 | 968.4 |
|  | Average number of amide groups and imide groups per repeat unit (N) |  | 4.0 | 4.2 | 6.7 | 4.4 | 4.7 | 4.0 | 4.0 |
|  | M/N |  | 230.0 | 234.0 | 290.7 | 237.0 | 243.9 | 208.8 | 242.1 |
|  | A/(C + D) |  | 50/100 | 52.5/100 | 70/100 | 55/100 | 57.5/100 | 30/100 | 70/100 |
|  | C/D |  | 100 | 95/5 | 60/40 | 90/10 | 85/15 | 100 | 100 |
| Characteristics of polyamide-imide enameled wire | Dimension (mm) | Diameter of conductor | 0.800 | 0.800 | 0.800 | 0.800 | 0.800 | 0.800 | 0.800 |
|  |  | Thickness of film | 0.045 | 0.046 | 0.046 | 0.045 | 0.045 | 0.046 | 0.045 |
|  |  | Overall diameter | 0.890 | 0.892 | 0.891 | 0.890 | 0.890 | 0.891 | 0.890 |
|  | Flexibility | Winding of self overall diameter of wire | Passed | Passed | Passed | Passed | Passed | Passed | Passed |
|  | Abrasion resistance | Number of reciprocating abrasion | 396 | 440 | 388 | 423 | 399 | 452 | 392 |
|  | Heat resistance (280° C. × 168 h) | Insulation breakdown remaining ratio (%) | 73.0 | 78.0 | 68.3 | 79.0 | 77.8 | 74.2 | 77.6 |
|  | Hydrolyzability resistance (Water 0.1 vol %, 140° C. × 1000 h) | Insulation breakdown remaining ratio (%) | 88.9 | 90.0 | 52.3 | 89.7 | 87.4 | 90.0 | 90.2 |
|  | Specific permittivity (1 kHz) | Dry-time In constant-temperature bath of 100° C. | 3.46 | 3.45 | 3.28 | 3.44 | 3.15 | 3.50 | 3.30 |
|  |  | Wet-time (25° C. and 50% RH) | 3.85 | 3.80 | 3.48 | 3.67 | 3.35 | 3.99 | 3.56 |
|  | Partial discharge inception voltage (25° C. and 50% RH) | (Vp) (50 Hz, detection sensitivity: 10 pC) | 920 | 942 | 993 | 950 | 1012 | 905 | 970 |

Hereafter, specific descriptions will be provided.

Example 1

For Example 1, the following items were used: 231.0 g (0.5 mol) of BIPP (Mw=462) as an aromatic diisocyanate component (A) having three or more benzene rings in the monomer, 125.0 g (0.5 mol) of 4,4'-MDI (Mw=250) as an aromatic diisocyanate component (B) having two or less benzene rings in the monomer, 192.0 g (1.0 mol) of TMA (Mw=192) as an aromatic tricarboxylic anhydride (C), and 1,600 g of NMP as a solvent. They were mixed and synthesized at 140° C., and a polyamide-imide resin insulating paint having reduced viscosity of approximately 0.5 dl/g and resin concentration of approximately 25% by weight was obtained.

Example 2

For Example 2, the following items were used: 242.6 g (0.525 mol) of BIPP as an aromatic diisocyanate component (A) having three or more benzene rings in the monomer, 118.8 g (0.475 mol) of 4,4'-MDI as an aromatic diisocyanate component (B) having two or less benzene rings in the monomer, 182.4 g (0.95 mol) of TMA as an aromatic tricarboxylic anhydride (C), 10.9 g (0.05 mol) of PMDA (Mw=218) as a tetracarboxylic dianhydride component (D), and 1,600 g of NMP as a solvent. They were mixed and synthesized at 140° C., and a polyamide-imide resin insulating paint having reduced viscosity of approximately 0.5 dl/g and resin concentration of approximately 25% by weight was obtained.

Example 3

For Example 3, the following items were used: 338.8 g (0.7 mol) of BIPS (Mw=484) as an aromatic diisocyanate component (A) having three or more benzene rings in the monomer, altogether 75.0 g (0.3 mol) of MDI comprising 62.5 g of 4,4'-MDI (Mw=250) and 12.5 g of 2,4'-MDI (Mw=250) as an aromatic diisocyanate component (B) having two or less benzene rings in the monomer, 115.2 g (0.6 mol) of TMA as an aromatic tricarboxylic anhydride (C), 143.2 g (0.4 mol) of DSDA (Mw=358) as a tetracarboxylic dianhydride component (D), and 2,000 g of NMP as a solvent. They were mixed and synthesized at 140° C., and a polyamide-imide resin insulating paint having reduced viscosity of approximately 0.5 dl/g and resin concentration of approximately 25% by weight was obtained.

Example 4

For Example 4, the following items were used: 239.8 g (0.55 mol) of BIPS (Mw=436) as an aromatic diisocyanate component (A) having three or more benzene rings in the monomer, 112.5 g (0.45 mol) of 4,4'-MDI as an aromatic diisocyanate component (B) having two or less benzene rings in the monomer, 172.8 g (0.9 mol) of TMA as an aromatic tricarboxylic anhydride component (C), 32.2 g (0.1 mol) of BTDA (Mw=322) as an aromatic tetracarboxylic dianhydride component (D), and 1,600 g of NMP as a solvent. They were mixed and synthesized at 140° C., and a polyamide-imide resin insulating paint having reduced viscosity of approximately 0.5 dl/g and resin concentration of approximately 25% by weight was obtained.

Example 5

For Example 5, the following items were used: both 219.5 g (0.475 mol) of BIPP and 40.0 g (0.1 mol) of FDI (Mw=400) as aromatic diisocyanate components (A) having three or more benzene rings in the monomer, 106.3 g (0.425 mol) of 4,4'-MDI as an aromatic diisocyanate component (B) having two or less benzene rings in the monomer, 163.2 g (0.85 mol) of TMA as an aromatic tricarboxylic anhydride component (C), 46.5 g (0.15 mol) of ODPA (Mw=310) as an aromatic tetracarboxylic dianhydride component (D), and 1,700 g of NMP as a solvent. They were mixed and synthesized at 140° C., and a polyamide-imide resin insulating paint having reduced viscosity of approximately 0.5 dl/g and resin concentration of approximately 25% by weight was obtained.

Example 6

For Example 6, the following items were used: 138.6 g (0.3 mol) of BIPP as an aromatic diisocyanate component (A) having three or more benzene rings in the monomer, 175.0 g (0.7 mol) of 4,4'-MDI as an aromatic diisocyanate component (B) having two or less benzene rings in the monomer, 192.0 g (1.0 mol) of TMA as aromatic tricarboxylic anhydride (C), and 1,200 g of NMP as a solvent. They were mixed, synthesized at 140° C., and diluted with 300 g of DMF, and then a polyamide-imide resin insulating paint having reduced viscosity of approximately 0.5 dl/g and resin concentration of approximately 25% by weight was obtained.

Example 7

For Example 7, the following items were used: 305.2 g (0.7 mol) of BIPE as an aromatic diisocyanate component (A) having three or more benzene rings in the monomer, 75.0 g (0.3 mol) of 4,4'-MDI as an aromatic diisocyanate component (B) having two or less benzene rings in the monomer, 192.0 g (1.0 mol) of TMA as an aromatic tricarboxylic anhydride (C), and 1,350 g of NMP as a solvent. They were mixed, synthesized at 140° C., and diluted with 350 g of DMF, and then a polyamide-imide resin insulating paint having reduced viscosity of approximately 0.5 dl/g and resin concentration of approximately 25% by weight was obtained.

TABLE 2

| | | | Example 8 | Example 9 | Example 10 | Example 11 | Example 12 | Example 13 | Example 14 |
|---|---|---|---|---|---|---|---|---|---|
| Raw-material composition of polyamide-imide resin paint | Diamine component (E) having three or more benzene rings | BAPP (Mw = 410) | 215.3 (52.5) | | | | 194.8 (47.5) | 225.5 (55.0) | |
| | | BAPS (Mw = 432) | | 237.6 (55.0) | 302.4 (70.0) | | | | |
| | | BAPE (Mw = 384) | | | | 220.8 (57.5) | | | 163.2 (42.5) |
| | | FDA (Mw = 348) | | | | | 34.8 (10.0) | | 34.8 (10.0) |
| | Diisocyanate component (B) having two or less benzene rings | 4,4'-MDI (Mw = 250) | 118.8 (47.5) | | 75.0 (30.0) | 106.3 (42.5) | 106.3 (42.5) | 112.5 (45.0) | 118.8 (47.5) |
| | | 2,4'-MDI (Mw = 250) | | | | | | | |
| | | 2,4'-TDI (Mw = 174) | | 78.3 (45.0) | | | | | |
| | Tricarboxylic anhydride component (C) | TMA (Mw = 192) | 182.4 (95.0) | 172.8 (90.0) | 115.2 (60.0) | 163.2 (85.0) | 163.2 (85.0) | 172.8 (90.0) | 182.4 (95.0) |
| | Tetracarboxylic dianhydride component (D) | PMDA (Mw = 218) | 10.9 (5.0) | | | | | | 10.9 (5.0) |
| | | BTDA (Mw = 322) | | 32.3 (10.0) | | | | 32.2 (10.0) | |
| | | ODPA (Mw = 310) | | | | | 46.5 (15.0) | 46.5 (15.0) | |
| | | DSDA (Mw = 358) | | | 143.2 (40.0) | | | | |
| | Solvent | NMP | 1600 | 1500 | 1900 | 240 | 240 | 1200 | 1200 |
| | | γ-butyrolactone | | | | 1360 | 1360 | | |
| | | DMF | | | | | | 400 | 350 |
| Features of polyamide-imide resin paint | Appearance | | Brown | Brown | Brown | Brown | Light brown | Brown | Brown |
| | Reduced viscosity (dl/g) | | 0.50 | 0.50 | 0.51 | 0.51 | 0.52 | 0.50 | 0.51 |
| | Nonvolatile content (w %) | | 24.7 | 25.6 | 24.9 | 25.0 | 25.3 | 25.2 | 24.6 |
| | Molecular weight per repeat unit (M) | | 982.8 | 998.5 | 1947.8 | 1125.6 | 1146.2 | 1003.4 | 950.5 |
| | Average number of amide groups and imide groups per repeat unit (N) | | 4.2 | 4.4 | 6.7 | 4.7 | 4.7 | 4.4 | 4.2 |
| | M/N | | 234.0 | 226.9 | 290.7 | 239.5 | 243.9 | 228.0 | 226.3 |
| | A/(C + D) | | 52.5/100 | 55/100 | 70/100 | 57.5/100 | 57.5/100 | 55/100 | 57.5/100 |
| | C/D | | 95/5 | 90/10 | 60/40 | 85/15 | 85/15 | 90/10 | 95/5 |
| Characteristics of polyamide-imide enameled wire | Dimension (mm) | Diameter of conductor | 0.800 | 0.800 | 0.800 | 0.800 | 0.800 | 0.800 | 0.800 |
| | | Thickness of film | 0.046 | 0.046 | 0.045 | 0.045 | 0.046 | 0.045 | 0.046 |
| | | Overall diameter | 0.891 | 0.891 | 0.890 | 0.890 | 0.891 | 0.890 | 0.891 |
| | Flexibility | Winding of self overall diameter of wire | Passed | Passed | Passed | Passed | Passed | Passed | Passed |
| | Abrasion resistance | Number of reciprocating abrasion | 450 | 375 | 378 | 421 | 402 | 389 | 433 |
| | Heat resistance (280° C. × 168 h) | Insulation breakdown remaining ratio (%) | 79.1 | 70.2 | 68.8 | 80.1 | 75.6 | 69.9 | 81.9 |
| | Hydrolyzability | Insulation | 89.0 | 60.3 | 51.3 | 88.5 | 87.7 | 86.3 | 90.5 |

TABLE 2-continued

|  |  | Example 8 | Example 9 | Example 10 | Example 11 | Example 12 | Example 13 | Example 14 |
|---|---|---|---|---|---|---|---|---|
| resistance (Water 0.1 vol %, 140° C. × 1000 h) | breakdown remaining ratio (%) |  |  |  |  |  |  |  |
| Specific permittivity (1 kHz) | Dry-time In constant-temperature bath of 100° C. | 3.44 | 3.47 | 3.27 | 3.34 | 3.15 | 3.48 | 3.22 |
|  | Wet-time (25° C. and 50% RH) | 3.83 | 3.81 | 3.48 | 3.51 | 3.34 | 3.95 | 3.44 |
| Partial discharge inception voltage (25° C. and 50% RH) | (Vp) (50 Hz, detection sensitivity: 10 pC) | 930 | 933 | 986 | 980 | 1022 | 904 | 1001 |

Example 8

The following items were used for the first stage synthetic reaction of Example 8: 215.3 g (0.525 mol) of BAPP (Mw=410) as an aromatic diamine component (E) having three or more benzene rings in the monomer, 182.4 g (0.95 mol) of TMA as an aromatic tricarboxylic anhydride component (C), 10.9 g (0.05 mol) of PMDA as an aromatic tetracarboxylic dianhydride component (D), and 1,000 g of NMP as a solvent. They were mixed and synthesized at 180° C. while water was discharged to the outside of the system, and then the mixture was cooled to 60° C. in the same nitrogen atmosphere. Then, for the second stage synthetic reaction, 118.8 g (0.475 mol) of 4,4'-MDI as an aromatic diisocyanate component (B) and 600 g of NMP as a solvent were added to the above mixture, synthesized at 140° C., and a polyamide-imide resin insulating paint having reduced viscosity of approximately 0.5 dl/g and resin concentration of approximately 25% by weight was obtained.

Example 9

The following items were used for the first stage synthetic reaction of Example 9: 237.6 g (0.55 mol) of BAPS (Mw=432) as an aromatic diamine component (E) having three or more benzene rings in the monomer, 172.8 g (0.9 mol) of TMA as an aromatic tricarboxylic anhydride component (C), 32.2 g (0.1 mol) of BTDA as an aromatic tetracarboxylic dianhydride component (D), and 1,000 g of NMP as a solvent. They were mixed and synthesized at 180° C. while water was discharged to the outside of the system, then the mixture was cooled to 60° C. in the same nitrogen atmosphere. Then, for the second stage synthetic reaction, 78.3 g (0.45 mol) of 2,4-TDI (Mw=174) as an aromatic diisocyanate component (B), and 500 g of NMP as a solvent were added to the above mixture, synthesized at 140° C., and a polyamide-imide resin insulating paint having reduced viscosity of approximately 0.5 dl/g and resin concentration of approximately 25% by weight was obtained.

Example 10

The following items were used for the first stage synthetic reaction of Example 10: 302.4 g (0.7 mol) of BAPS as an aromatic diamine component (E) having three or more benzene rings in the monomer, 115.2 g (0.6 mol) of TMA as an aromatic tricarboxylic anhydride component (C), 143.2 g (0.4 mol) of DSDA as an aromatic tetracarboxylic dianhydride component (D), and 1,200 g of NMP as a solvent. They were mixed and synthesized at 180° C. while water was discharged to the outside of the system, then the mixture was cooled to 60° C. in the same nitrogen atmosphere. Then for the second stage synthetic reaction, 75.0 g (0.3 mol) of 4,4'-MDI as an aromatic diisocyanate component (B), and 700 g of NMP as a solvent were added to the above mixture, synthesized at 140° C., and a polyamide-imide resin insulating paint having reduced viscosity of approximately 0.5 dl/g and resin concentration of approximately 25% by weight was obtained.

Example 11

The following items were used for the first stage synthetic reaction of Example 11: 220.8 g (0.575 mol) of BAPE (Mw=384) as an aromatic diamine component (E) having three or more benzene rings in the monomer, 163.2 g (0.85 mol) of TMA as an aromatic tricarboxylic anhydride component (C), 46.5 g (0.15 mol) of ODPA as an aromatic tetracarboxylic dianhydride component (D), and both 240 g of NMP and 860 g of γ-butyrolactone as solvents. They were mixed and synthesized at 180° C. while water was discharged to the outside of the system, then the mixture was cooled to 60° C. in the same nitrogen atmosphere. Then, for the second stage synthetic reaction, 106.3 g (0.425 mol) of 4,4'-MDI as an aromatic diisocyanate component (B), and 500 g of γ-butyrolactone as a solvent were added to the above mixture, synthesized at 140° C., and a polyamide-imide resin insulating paint having reduced viscosity of approximately 0.5 dl/g and resin concentration of approximately 25% by weight was obtained.

Example 12

The following items were used for the first stage synthetic reaction of Example 12: both 194.8 g (0.475 mol) of BAPP and 34.8 g (0.1 mol) of FDA (Mw=348) as aromatic diamine components (E) having three or more benzene rings in the monomer, 163.2 g (0.85 mol) of TMA as an aromatic tricarboxylic anhydride component (C), 46.5 g (0.15 mol) of ODPA as an aromatic tetracarboxylic dianhydride component (D), and both 240 g of NMP and 860 g of γ-butyrolactone as solvents. They were mixed and synthesized at 180° C. while water was discharged to the outside of the system, then the mixture was cooled to 60° C. in the same nitrogen atmosphere. Then, for the second stage synthetic reaction, 106.3 g (0.425 mol) of 4,4'-MD1 as an aromatic diisocyanate component (B), and 500 g of γ-butyrolactoneas a solvent were added to the above mixture, synthesized at 140° C., and a polyamide-imide resin insulating paint having reduced viscosity of approximately 0.5 dl/g and resin concentration of approximately 25% by weight was obtained.

Example 13

The following items were used for the first stage synthetic reaction of Example 13: 225.5 g (0.55 mol) of BAPP as an aromatic diamine component (E) having three or more benzene rings in the monomer, 172.8 g (0.9 mol) of TMA as an aromatic tricarboxylic anhydride component (C), 32.2 g (0.1 mol) of BTDA as an aromatic tetracarboxylic dianhydride component (D), and 1,200 g of NMP as a solvent. They were mixed and synthesized at 180° C. while water was discharged to the outside of the system, then the mixture was cooled to 60° C. in the same nitrogen atmosphere. Then, for the second stage synthetic reaction, 112.5 g (0.45 mol) of 4,4'-MDI as an aromatic diisocyanate component (B), and 400 g of γ-butyrolactone as a solvent were added to the above mixture, synthesized at 140° C., and a polyamide-imide resin insulating paint having reduced viscosity of approximately 0.5 dl/g and resin concentration of approximately 25% by weight was obtained.

Example 14

The following items were used for the first stage synthetic reaction of Example 14: both 163.2 g (0.425 mol) of BAPE and 34.8 g (0.1 mol) of FDA as aromatic diamine components (E) having three or more benzene rings in the monomer, 182.4 g (0.95 mol) of TMA as an aromatic tricarboxylic anhydride component (C), 10.9 g (0.05 mol) of PMDA as an aromatic tetracarboxylic dianhydride component (D), and 1,200 g of NMP as a solvent. They were mixed and synthesized at 180° C. while water was discharged to the outside of the system, then the mixture was cooled to 60° C. in the same nitrogen atmosphere. Then, for the second stage synthetic reaction, 118.8 g (0.475 mol) of 4,4'-MDI as an aromatic diisocyanate component (B), and 350 g of γ-butyrolactone as a solvent were added to the above mixture, synthesized at 140° C., and a polyamide-imide resin insulating paint having reduced viscosity of approximately 0.5 dl/g and resin concentration of approximately 25% by weight was obtained.

TABLE 3

| | | | Comparative example 1 | Comparative example 2 | Comparative example 3 | Comparative example 4 | Comparative example 5 | Comparative example 6 | Comparative example 7 |
|---|---|---|---|---|---|---|---|---|---|
| Polyamide-imide resin paint raw-material composition | Diamine component (E) having three or more benzene rings | BAPP (Mw = 410) | | | | 184.5 (45.0) | 328.0 (80.0) | 291.1 (71.0) | |
| | Diisocyanate component (A) having three or more benzene rings | BIPP (Mw = 462) | | | | | | | 87.2 (20.0) |
| | Diisocyanate component (B) having two or less benzene rings | 4,4'-MDI (Mw = 250) | 250.0 (100.0) | 250.0 (100.0) | 250.0 (100.0) | 137.5 (55.0) | 50.0 (20.0) | 72.5 (29.0) | 200.0 (80.0) |
| | | 2,4'-MDI (Mw = 250) | | | | | | | |
| | | 2,4'-TDI (Mw = 174) | | | | | | | |
| | Tricarboxylic anhydride component (C) | TMA (Mw = 192) | 192.0 (100.0) | 144.0 (75.0) | 115.2 (60.0) | 192.0 (100.0) | 192.0 (100.0) | 111.4 (58.0) | 192.0 (100.0) |
| | Tetracarboxylic dianhydride component (D) | PMDA (Mw = 218) | | | | | | | |
| | | BTDA (Mw = 322) | | | | 128.8 (40.0) | | | |
| | | ODPA (Mw = 310) | | | | | | | |
| | | DSDA (Mw = 358) | | 89.5 (25.0) | | | | 150.4 (42.0) | |
| | Solvent | NMP | 1300 | 1450 | 1900 | 1500 | 1700 | 1200 | 1100 |
| | | γ-butyrolactone | | | | | | 600 | |
| | | DMF | | | | | | | 300 |
| Features of polyamide-imide resin paint | Appearance | | Brown | Brown | Precipitation | Light brown | Light brown | Brown | Brown |
| | Reduced viscosity (dl/g) | | 0.51 | 0.50 | — | 0.28 | 0.31 | 0.46 | 0.50 |
| | Nonvolatile content (wt %) | | 25.2 | 24.9 | — | 25.4 | 25.0 | 25.7 | 25.2 |
| | Molecular weight per repeat unit (M) | | 354.0 | 791.0 | 812.0 | — | — | 1083.8 | 792.8 |
| | Average number of amide groups and imide groups per repeat unit (N) | | 2.0 | 4.0 | 4.0 | — | — | 6.8 | 4.0 |
| | M/N | | 177.0 | 197.8 | 203.0 | — | — | 159.4 | 198.2 |
| | A/(C + D) | | 0/100 | 0/100 | 0/100 | 45/100 | 80/100 | 71/100 | 20/100 |
| | C/D | | 100 | 75/25 | 60/40 | 100 | 100 | 58/42 | 100 |
| Characteristics of polyamide-imide enameled wire | Dimension (mm) | Diameter of conductor | 0.800 | 0.800 | — | 0.800 | 0.800 | 0.800 | 0.800 |
| | | Thickness of film | 0.045 | 0.046 | — | 0.045 | 0.045 | 0.045 | 0.045 |
| | | Overall diameter | 0.890 | 0.891 | — | 0.890 | 0.890 | 0.890 | 0.890 |
| | Flexibility | Winding of self overall diameter of wire | Passed | Passed | — | Failed | Failed | Failed | Passed |
| | Abrasion resistance | Number of reciprocating abrasion | 466 | 301 | — | 56 | 62 | 112 | 458 |
| | Heat resistance (280° C. × 168 h) | Insulation breakdown remaining ratio (%) | 78.2 | 72.2 | — | 65.1 | 21.2 | 63.3 | 75.0 |

TABLE 3-continued

|  |  | Comparative example 1 | Comparative example 2 | Comparative example 3 | Comparative example 4 | Comparative example 5 | Comparative example 6 | Comparative example 7 |
|---|---|---|---|---|---|---|---|---|
| Hydrolyzability resistance (Water 0.1 vol %, 140° C. × 1000 h) | Insulation breakdown remaining ratio (%) | 88.3 | 65.8 | — | 14.1 | 13.8 | 55.2 | 89.2 |
| Specific permittivity (1 kHz) | Dry-time In constant-temperature bath of 100° C. | 4.06 | 3.99 | — | 3.84 | 3.90 | 3.44 | 3.54 |
|  | Wet-time (25° C. and 50% RH) | 4.48 | 4.40 | — | 4.31 | 4.35 | 3.83 | 4.05 |
| Partial discharge inception voltage (25° C. and 50% RH) | (Vp) (50 Hz, detection sensitivity: 10 pC) | 833 | 848 | — | 854 | 849 | 923 | 889 |

Comparative Example 1

For Comparative example 1, 250.0 g (1.0 mol) of 4,4'-MDI as an aromatic diisocyanate component (B), 192.0 g (1.0 mol) of TMA as an aromatic tricarboxylic anhydride component (C), and 1,300 g of NMP as a solvent were used. They were mixed and synthesized at 140° C., and a polyamide-imide resin insulating paint having reduced viscosity of approximately 0.5 dl/g and resin concentration of approximately 25% by weight was obtained.

Comparative Example 2

For Comparative example 2, 250.0 g (1.0 mol) of 4,4'-MDI as an aromatic diisocyanate component (B), 144.0 g (0.75 mol) of TMA as an aromatic tricarboxylic anhydride (C), 89.5 g (0.25 mol) of DSDA as an aromatic tetracarboxylic dianhydride component (D), and 1,450 g of NMP as a solvent were used. They were mixed and synthesized at 140° C., and a polyamide-imide resin insulating paint having reduced viscosity of approximately 0.5 dl/g and resin concentration of approximately 25% by weight was obtained.

Comparative Example 3

For Comparative example 3, 250.0 g (1.0 mol) of 4,4'-MDI as an aromatic diisocyanate component (B), 115.2 g (0.6 mol) of TMA as an aromatic tricarboxylic anhydride (C), 128.8 g (0.4 mol) of BTDA as an aromatic tetracarboxylic dianhydride component (D), and 1,900 g of NMP as a solvent were used. They were mixed and synthesized at 140° C., and a polyamide-imide resin insulating paint having reduced viscosity of approximately 0.5 dl/g and resin concentration of approximately 25% by weight was obtained.

Comparative Example 4

The following items were used for the first stage synthetic reaction of Comparative example 4: 184.5 g (0.45 mol) of BAPP as an aromatic diamine component (E) having three or more benzene rings in the monomer, 192.0 g (1.0 mol) of TMA as an aromatic tricarboxylic anhydride component (C), and 1,200 g of NMP as a solvent. They were mixed and synthesized at 180° C. while water was discharged to the outside of the system, then the mixture was cooled to 60° C. in the same nitrogen atmosphere. Then, for the second stage synthetic reaction, 137.5 g (0.55 mol) of 4,4'-MDI as an aromatic diisocyanate component (B), and 300 g of NMP as a solvent were added to the above mixture, synthesized at 140° C., and a polyamide-imide resin insulating paint having reduced viscosity of approximately 0.5 dl/g and resin concentration of approximately 25% by weight was obtained.

Comparative Example 5

The following items were used for the first stage synthetic reaction of Comparative example 5: 328.0 g (0.8 mol) of BAPP as an aromatic diamine component (E) having three or more benzene rings in the monomer, 192.0 g (1.0 mol) of TMA as an aromatic tricarboxylic anhydride component (C), and 1,200 g of NMP as a solvent. They were mixed and synthesized at 180° C. while water was discharged to the outside of the system, then the mixture was cooled to 60° C. in the same nitrogen atmosphere. Then for the second stage synthetic reaction, 50.0 g (0.2 mol) of 4,4'-MDI as an aromatic diisocyanate component (B) and 500 g of NMP as a solvent were added to the above mixture, synthesized at 140° C., and a polyamide-imide resin insulating paint having reduced viscosity of approximately 0.5 dl/g and resin concentration of approximately 25% by weight was obtained.

Comparative Example 6

The following items were used for the first stage synthetic reaction of Comparative example 6: 291.1 g (0.71 mol) of BAPP as an aromatic diamine component (E) having three or more benzene rings in the monomer, 111.4 g (0.58 mol) of TMA as an aromatic tricarboxylic anhydride component (C), 150.4 g (0.42 mol) of DSDA as an aromatic tetracarboxylic dianhydride component (D), and 1,200 g of NMP as a solvent. They were mixed and synthesized at 180° C. while water was discharged to the outside of the system, then the mixture was cooled to 60° C. in the same nitrogen atmosphere. Then, for the second stage synthetic reaction, 72.5 g (0.29 mol) of 4,4'-MDI as an aromatic diisocyanate component (B), and 600 g of γ-butyrolactone as a solvent were added to the above mixture, synthesized at 140° C., and a polyamide-imide resin insulating paint having reduced viscosity of approximately 0.5 dl/g and resin concentration of approximately 25% by weight was obtained.

Comparative Example 7

For Comparative example 7, the following items were used: 87.2 g (0.2 mol) of BIPP as an aromatic diisocyanate component (A) having three or more benzene rings in the monomer, 200.0 g (0.8 mol) of 4,4'-MDI as an aromatic diisocyanate component (B) having two or less benzene rings in the monomer, 192.0 g (1.0 mol) of TMA as an aromatic tricarboxylic anhydride (C), and 1,100 g of NMP as a solvent. They were mixed and synthesized at 140° C., diluted with 300 g of DMF, and then a polyamide-imide resin insulating paint having reduced viscosity of approximately 0.5 dl/g and resin concentration of approximately 25% by weight was obtained.

Comparative example 1 shows a versatilely used polyamide-imide enameled wire wherein flexibility, abrasion resistance, heat resistance, and hydrolyzability resistance are good; however, specific permittivity is high, and partial discharge inception voltage is low.

On the other hand, polyamide-imide enameled wires according to Examples 1 to 14 have low dry-time permittivity which is equal to or less than 3.5, and it was verified that partial discharge inception voltage increased by 70 to 200 V. Other general characteristics were as good as those of conventional enameled wires.

In Comparative examples 2 and 3, an aromatic tetracarboxylic dianhydride component was simultaneously used along with a versatilely used polyamide-imide, and the number of imide groups was increased. However, in Comparative example 2, dry-time permittivity decreased only slightly, abrasion resistance decreased a little, and major effects could not be obtained. In Comparative example 3, because the number of imide groups increased, solubility became worse and precipitation occurred during the process of making paint.

In Comparative example 4, a compounding ratio of BIPP was set at 45, and reduced viscosity of paint, which is a molecular weight, did not increase, and a high-molecular form was not created even in the enamel film. Consequently, flexibility and abrasion resistance significantly decreased. It was considered that TMA's excess acid anhydride turned into carboxylic acid due to water present within the system, thereby decreasing reactivity.

In Comparative example 5, a compounding ratio of BIPP was set at 80, and the general characteristics of the product also greatly deteriorated. It was considered that excess amino groups reacted with isocyanate groups, causing many urea linkages, and therefore, general characteristics of amide-imide could not be maintained.

In Comparative example 6, an aromatic tetracarboxylic dianhydride component was simultaneously used, and a compounding ratio was determined without the existence of excess acid anhydride and amino groups. However, because a compounding ratio of BIPP exceeded 70, the imide ratio increased, causing rigidity to increase and flexibility to decrease.

In Comparative example 7, a ratio M/N between the molecular weight (M) of polyamide-imide resin for one repeat unit and the total number (N) of both amide groups and imide groups was less than 200; and dry-time permittivity exceeded 3.5.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A polyamide-imide resin insulating paint, including a low permittivity polyamide-imide resin containing no halogen element in its molecular chain which is dissolved in a polar solvent, wherein:
    the low permittivity polyamide-imide resin is made by mixing an aromatic imide prepolymer, which contains an aromatic diamine component (E) consisting of an aromatic diamine having three or more benzene rings in a monomer and an acid component consisting of an aromatic tricarboxylic anhydride (C) and an aromatic tetracarboxylic dianhydride (D), with an aromatic diisocyanate component (B) consisting of an aromatic isocyanante having two or less benzene rings in a monomer, having a compounding ratio between C and D of C/D=95/5 to 60/40, a compounding ratio among E, C and D of E/(C+D)=51/100 to 70/100, and a ratio M/N between a molecular weight (M) of the polyamide-imide resin per repeat unit and an average number (N) of amide groups and imide groups is equal to or more than 200.

2. The polyamide-imide resin insulating paint according to claim 1, wherein the low permittivity polyamide-imide resin has a specific permittivity equal to or less than 3.5.

3. The polyamide-imide resin insulating paint according to claim 1, wherein:
    the aromatic diamine component (E) consisting of aromatic diamine having three or more benzene rings in the monomer is at least one selected from the group consisting of:
    2,2-bis[4-(4-aminophenoxy)phenyl]propane (BAPP);
    bis[4-(4-aminophenoxy)phenyl]sulfone (BAPS);
    bis[4-(4-aminophenoxy)phenyl]ether (BAPE); fluorene diamine (FDA), 4,4'-bis(4-aminophenoxy)biphenyl;
    1,4-bis(4-aminophenoxy)benzene and isomers thereof.

4. The polyamide-imide resin insulating paint according to claim 1, wherein, the aromatic diamine component (E) consisting of aromatic diamine having three or more benzene rings in the monomer is 2,2-bis[4-(4-aminophenoxy)phenyl]propane (BAPP).

5. The polyamide-imide resin insulating paint according to claim 1, wherein the aromatic diamine component (E) consisting of aromatic diamine having three or more benzene rings in the monomer is bis[4-(4-aminophenoxy)phenyl]sulfone (BAPS).

6. The polyamide-imide resin insulating paint according to claim 1, wherein the aromatic diamine component (E) consisting of aromatic diamine having three or more benzene rings in the monomer is bis[4-(4-aminophenoxy)phenyl]ether (BAPE).

7. The polyamide-imide resin insulating paint according to claim 1, wherein the aromatic diamine component (E) consisting of aromatic diamine having three or more benzene rings in the monomer is a mixture of 2,2-bis[4-(4-aminophenoxy)phenyl]propane (BAPP) and fluorene diamine (FDA).

8. The polyamide-imide resin insulating paint according to claim 1, wherein the aromatic diamine component (E) consisting of aromatic diamine having three or more benzene rings in the monomer is a mixture of bis[4-(4-aminophenoxy)phenyl]ether (BAPE) and fluorene diamine (FDA).

9. An insulated wire, comprising a conductor and a film, wherein:
    the polyamide-imide resin insulating paint according to claim 1 is applied directly on the conductor or on another insulation film and is baked to form the film.

10. An insulated wire, comprising a conductor and a film, wherein:
    the polyamide-imide resin insulating paint according to claim 3 is applied directly on the conductor or on another insulation film and is baked to form the film.

11. An insulated wire, comprising a conductor and a film, wherein:
    the polyamide-imide resin insulating paint according to claim 4 is applied directly on the conductor or on another insulation film and is baked to form the film.

12. A polyamide-imide resin insulating paint, including a low permittivity polyamide-imide resin containing no halogen element in its molecular chain which is dissolved in a polar solvent, wherein:

the low permittivity polyamide-imide resin is made by mixing an aromatic imide prepolymer, which contains an aromatic diamine component (E) consisting of an aromatic diamine having three or more benzene rings in a monomer and an acid component consisting of an aromatic tricarboxylic anhydride (C) and an aromatic tetracarboxylic dianhydride (D), with an aromatic diisocyanate component (B) consisting of an aromatic isocyanante having two or less benzene rings in a monomer, having a compounding ratio among E, C and D of E/(C+D)=51/100 to 70/100, and a ratio M/N between a molecular weight (M) of the polyamide-imide resin per repeat unit and an average number (N) of amide groups and imide groups is equal to or more than 200.

\* \* \* \* \*